United States Patent [19]

Ida

[11] 4,130,407
[45] Dec. 19, 1978

[54] STRENGTHENING OF GLASS

[75] Inventor: Nobel Ida, Boulder, Colo.

[73] Assignee: Duraglass Research & Development Corp., Boulder, Colo.

[21] Appl. No.: 807,256

[22] Filed: Jun. 16, 1977

[51] Int. Cl.$^2$ .................. C03C 15/00; C03C 17/00; C03B 27/00

[52] U.S. Cl. .................. 65/30 E; 65/30 R; 65/60 B; 65/60 C; 65/116; 427/133; 427/385 A; 427/407 A

[58] Field of Search .................. 65/30 E, 30 R, 116, 65/60 B, 25 R, 60 C; 427/133, 385 A, 407 A

[56] References Cited

U.S. PATENT DOCUMENTS

| 3,387,994 | 6/1968 | Dunton et al. | 65/60 B |
|---|---|---|---|
| 3,420,693 | 1/1969 | Scholes et al. | 65/30 R |
| 3,481,726 | 12/1969 | Fischer et al. | 65/30 F |
| 3,779,732 | 12/1973 | Spanoudis | 65/116 X |
| 3,844,754 | 10/1974 | Grubb et al. | 65/30 E |
| 3,997,250 | 12/1976 | Krohn et al. | 65/30 E |
| 4,017,291 | 4/1977 | Gliemeroth et al. | 65/30 R |
| 4,023,951 | 5/1977 | Shaw et al. | 65/30 E |

OTHER PUBLICATIONS

Hackh's Chemical Dictionary, p. 616.

*Primary Examiner*—S. Leon Bashore
*Assistant Examiner*—Frank W. Miga
*Attorney, Agent, or Firm*—Kyle W. Rost

[57] ABSTRACT

Glass is strengthened against failure under tension by treating the glass with a combination of straight chain, saturated, terminal monocarboxyl fatty acid plus the salt of an alkali metal or an alkaline-earth metal, both dissolved in an inert carrier and applied to the glass at a temperature in a preferred range between 100° and 300° C., after which the glass is slowly cooled to avoid thermal stress.

11 Claims, No Drawings

STRENGTHENING OF GLASS

BACKGROUND OF THE INVENTION

1. Field of the Invention

The invention relates to glass manufacturing. More specifically, it relates to chemical treatment of glass for strengthening the microcrack structure of the surface thereof. A surface active agent such as a fatty acid is applied in combination with a catalyst or seeding agent and is chemisorbed on the surface of the glass.

2. Description of the Prior Art

Copending application Ser. No. 648,329, now U.S. Pat. No. 4,039,310 to Sipe and Ida, incorporated by reference herein, discloses a method for strengthening glass against failure under tension by chemisorbing fatty acids in the microcrack structure of the surface of the glass. This method calls for the fatty acid to be applied to the surface of the glass at temperatures from approximately 371° C. to the decomposition temperature of the fatty acid, perhaps 871° C. Experimental results suggested that application of the acids at significantly lower temperatures would fail to produce the observed strengthening.

Some support for the belief that fatty acids do not produce strengthening when applied at lower temperatures is found in U.S. Pat. No. 3,876,410 to Scholes, which teaches that fatty acid applied at such lower temperatures aids in producing a scratch resistant glass surface, but little improvement in the total strength of the glass was observed.

Fatty acids and their derivatives are known for other uses in connection with glass making, such as being a mold lubricant as taught in U.S. Pat. No. 3,495,962 to Norton; being a quenching agent for metalizing a glass surface as taught in U.S. Pat. No. 3,508,894 to Torok; or working in combination with titaniun esters to render glass scratch resistant as taught in U.S. Pat. No. 3,387,994 to Dunten et al.

SUMMARY OF THE INVENTION

Glass is strengthened against failure under tension by applying a fatty acid reacted with an inorganic salt to form a derivative. Preferably the salt is an alkali metal or an alkaline earth metal salt, premixed with the fatty acid. An inert carrier may be used to dilute the fatty acid derivative. The temperature of application is between the melting point of the fatty acid derivative and its decomposition temperature, for example between 100° C. and 500° C. with 100° to 300° being a preferred range. The treated glass say be slowly cooled to avoid thermal stress.

The main object of the invention is to chemisorb fatty acids on the surface of glass to strengthen the glass against failure under tension. By catalyzing the chemisorption with an alkaline earth metal atom, the fatty acid is chemisorbed onto the glass with improved efficiency and at lower temperatures.

DESCRIPTION OF THE PREFERRED EMBODIMENT

Phase I Experimentation

As reported in application Ser. No. 648,329, now U.S. Pat. No. 4,039,310, to Sipe and Ida, incorporated by reference, a method of strengthening glass by applying pure fatty acids or fatty acids in an inert carrier was developed and found useful at relatively high temperatures. Straight chain saturated fatty acids were caused to react with an element of glass composition, after which the coating was able to resist soaking in water, acid, or alkaline solution. The strength of the treated glass was judged by a drop test and found to be as much as eight times the strength of untreated glass, based on a drop height of eight times the average drop height of the untreated glass. All Phase I tests were conducted on hand blown glass spheres cooled in an annealing oven after application of the fatty acid.

Phase II Experimentation

The initial positive results achieved with hand blown apheres in Phase I led to further experimentation with commercially produced bottles. In order to explore the characteristics of the glass strengthening process on a single glass shape of uniform geometry, tests were conducted on pristine lime glass bottles produced for a commercially sold beverage. The bottles were fully annealed by the manufacturer but contained no hardened coating, and were received directly from the manufacturer's production line. The bottles were a 12 oz. amber bottle, supplied by Columbine Glass Company of Denver, Colo.

Bottle strengths were determined through a standard drop test onto a drop test fixture composed of two inch thick 4340 low alloy steel carburized to 0.010 in. an subsequently nitrided to depths of 0.015 inches. The bottles were dropped from a standard position in order to obtain uniform impact on the drop test fixture. The drop procedure was to drop each series of bottle investigated from heights compatible with consistent drop results.

The method of applying the fatty acid to the manufactured bottles was to preheat the bottles in an electrical furnace and apply the fatty acid by brush. The bottles were returned to the furnace in order to let excess fatty acid melt off and were allowed to furnace cool to room temperature to minimize the introduction of thermal stress. While the use of a brush or roller was suited to experimental work, it is anticipated that a spray mist or vapor would be a suitable application technique for commercial processes.

A beeswax carrier was used to both dilute and uniformly distribute the fatty acids. Beeswax was chosen because it is both miscible and compatable with fatty acids. Waxes such as beeswax are esters of long chain alcohols, usually monohydroxyl, and a fatty acid, and are therefore totally compatable with fatty acids. The major component of beeswax is myricyl palmitate, which was equated to beeswax for purposes of calculating molecular weights, as described below. Other miscible waxes may be used as the carrier.

Phase II testing began with the establishment of control strengths for untreated pristine bottles in the standard drop test. A series of 24 bottles established a mean drop height of 1.645 feet with a range from approximately 1.2 feet to 2.00 feet.

Treated bottles were evaluated with respect to four selected fatty acids applied in different concentrations and at different temperatures of application. The concentrations were determined by combining a selected mole-percent (M/%) of fatty acid with whatever mole-percent of inert carrier was required to produce a combined 100%. Specifically, stearic, behenic, glutamic, and palmitic acids were evaluated, each acid being applied in concentrations of 1.00, 1.25, and 1.50 mole-percent (M/%) at temperatures of application from 100° C.

to 300° C. The results were plotted for each concentration of each acid as a function of temperature of application and drop height, representative data from the resulting graphs being summarized in the tables below:

TABLE I

Stearic Acid: Drop Heights v. Temperature of Application At Various M/% Concentrations

| Temp. of application | Drop height (ft.) | | |
|---|---|---|---|
| | 1.0 M/% | 1.25 M/% | 1.50 M/% |
| 100° C. | 3.5 | 4.0 | 5.8 |
| 200° C. | 3.8 | 4.1 | 5.5 |
| 250° C. | 4.4 | 4.5 | 5.1 |
| 300° C. | 4.9 | 4.8 | 4.7 |

TABLE II

Glutamic Acid: Drop Height v. Temperature of Application At Various Concentrations

| Temp. of application | Drop height (ft.) | | |
|---|---|---|---|
| | 1.0 M/% | 1.25 M/% | 1.50 M/% |
| 100° C. | 5.7 | 5.4 | 4.2 |
| 200° C. | 5.4 | 5.2 | 4.4 |
| 250° C. | 4.8 | 4.8 | 5.0 |
| 300° C. | 4.4 | 4.5 | 5.3 |

TABLE III

Palmitic Acid: Drop Height v. Temperature Of Application At Various Concentrations

| Temp. of application | Drop height (ft.) | | |
|---|---|---|---|
| | 1.0 M/% | 1.25 M/% | 1.5 M/% |
| 100° C. | 5.1 | 3.4 | 3.1 |
| 200° C. | 5.0 | 3.8 | 3.5 |
| 250° C. | 4.8 | 4.1 | 4.0 |
| 300° C. | 4.7 | 4.5 | 4.3 |

TABLE IV

BEHENIC ACID: DROP HEIGHT v. TEMPERATURE OF APPLICATION AT VARIOUS CONCENTRATIONS

| Temp. of application | 1.0 M/% | 1.25 M/% | 1.5 M/% |
|---|---|---|---|
| 100° C | 5.9 | 5.7 | 5.5 |
| 200° C | 5.7 | 5.6 | 5.7 |
| 250° C | 5.5 | 5.5 | 5.8 |
| 300° C | 5.3 | 5.4 | 5.9 |

The results in tables I–IV reveal that each fatty acid underwent a transition at a certain temperature of application, the transition point being where all three concentration curves crossed with respect to temperature. The estimated transition points for the four fatty acids are summarized below:

TABLE V

APPROXIMATE TRANSITION POINTS OF FOUR FATTY ACIDS

| | Temp. | Drop height |
|---|---|---|
| Stearic Acid: | 275° C | 4.7 feet |
| Glutanic Acid: | 240° C | 4.9 feet |
| Palmitic Acid: | 330° C | 4.6 feet |
| Behenic Acid: | 200° C | 5.7 feet |

Transition point behavior was not consistent for the four acids, with stearic acid showing the reverse behavior to the other three. Below the transition temperature, stearic acid produced increasing glass strengths with increasing concentrations, while glutamic, palmitic, and behenic acids produced decreasing glass strengths with increasing concentrations, while glutamic, palmitic, and behenic acids produced increasing glass strengths with increasing concentrations.

Behenic acid produced the best results in the Phase II strengthening experiments. Consequently, further work attempted to improve behenic acid performance within the temperature ranges already investigated. One experiment that showed surprising success attempted to increase glass strength by adding the salt of an alkali metal or an alkaline-earth metal to the fatty acid. Specifically, calcium carbonate and sodium carbonate were tested as added inorganic salts.

The theory of Phase I experimentation was that a terminal carboxyl group of fatty acid reacted to combine with a constituent element of the glass, such as silicon, potassium, sodium, calcium, or magnesium to attach the fatty acid molecule to the glass surface at the terminal carboxyl group. The reaction between the fatty acid and the glass was believed to result in an organo-metallic compound with such representative elements of the glass. The alkali or alkaline-earth salt was added in Phase II testing to supply a metal ion to the fatty acid in advance of the contact between the fatty acid and the glass.

It is believed that the terminal carboxyl group of the fatty acid reacts with the metal ion to form a chelating compound, which readily combines with elements of the glass composition at temperatures lower than those investigated in Phase I testing. For example, a fatty acid molecule may be joined to a calcium ion, which is in turn bonded to a metal oxide of the glass, for example a calcium oxide. However, the exact mechanism by which the alkali or alkaline-earth salt assists the reaction between the fatty acid and the glass has not been investigated. Therefore, the salt may be referred to as a "seeding agent" which may operate as a catalyst, a chelating agent, or in some other capacity to aid the reaction between the fatty acid and the glass.

Both sodium carbonate and calcium carbonate were initially tested as seeding agents, with the sodium seeded coating proving to be water soluble while the calcium seeded coating was not. Accordingly, continued experiments were conducted with calcium carbonate as a representative inorganic salt insoluble in water. It is believed that the compatibility of the seeded ion with glass ingredients assists in chemisorbing the fatty acid to the glass surface.

Table VI, on the following page, summarizes the effect of calcium carbonate as a seeding agent when added to a solution of five mole-percent behenic acid in beeswax carrier, applied both at the apparent transition temperature for behenic acid of 200° C. and at 100° C. The concentrations were determined by mixing five percent of the molecular weight of behenic acid with the indicated percent of the molecular weight of calcium carbonate, and adding the requisite percent of the molecular weight of beeswax to equal 100%.

TABLE VI

Drop Height For Bottles Treated With 5 M/% Behenic Acid in Beeswax Carrier With $CaCO_3$ Seeding Agent at Two Temperatures Of Application:

| M/% of $CaCO_3$ added | Drop height (ft.) at 200° C. | Drop height (ft.) at 100° C. |
|---|---|---|
| 1 | 4.7 | 5.0 |
| 2 | 5.0 | 5.7 |
| 3 | 5.4 | 6.5 |
| 4 | 5.8 | 7.2 |
| 5 | 6.2 | 8.0 |
| 6 | 6.4 | 8.5 |

The drop heights achieved in Table VI reached the upper limit available with the specification drop test fixture, but further experiments on non-specification concrete surfaces achieved drop heights from fifteen to twenty feet. The seeded method appears to increase strengths of prefabricated bottles from six to eight times the strength of untreated bottles, as determined by drop testing.

The preferred system of fatty acid chemisorption on glass, based on experimental results and known properties of fatty acids, should utilize a mono-carboxylic acid in order to achieve the maximum polar characteristic to aid chemisorption. Further, the molecule should be of maximum molecular weight and longest chain for greatest polar differential, enhancing the known hydrophobic/hydrophylic character of the molecules. A straight chain, saturated molecule is desirable to enhance polar behavior. Also, high melting point is desired.

The temperature range over which the organo-metallic derivative of the fatty acid would be expected to chemisorb with the glass is between the melting point of the derivative and its decomposition temperature, generally below 500° C. The lowest temperatures of combination are preferred for economy and to avoid deformation of the preformed glass bottle.

I claim:

1. A method of strengthening glass against failure under tension, comprising:
   (a) mixing a fatty acid with the salt of an alkaline earth metal to form a fatty acid derivative wherein the metal is joined to a carboxyl group of the fatty acid, and
   (b) applying the fatty acid derivative to glass having the same alkaline earth metal as a constituent element thereof at a temperature between the melting point of the derivative and and approximately 300° C., the derivative being chemisorbed on the glass surface through chelating between said alkaline earth metal of the derivative and a constituent element of the glass composition.

2. The method of claim 1, wherein said alkaline earth metal salt is calcium carbonate.

3. The method of claim 1, wherein said fatty acid derivative is mixed with a carrier that is miscible, compatible and inert with respect to the fatty acid derivative prior to application to the glass.

4. The method of claim 3, wherein said fatty acid has a concentration of approximately five mole-percent or less; said alkaline earth metal salt has a concentration of approximately six mole-percent or less, and said carrier has a concentration of ninety-four mole-percent or more to provide a total of one-hundred mole-percent.

5. The method of claim 1, wherein said fatty acid is a straight chain molecule.

6. The method of claim 1, wherein said fatty acid is a monocarboxylic with a terminal carboxyl group.

7. The method of claim 1, wherein said fatty acid is behenic acid.

8. The method of claim 1, further comprising slowly cooling said glass after application of the fatty acid derivative.

9. The method of strengthening lime glass, containing a known alkaline earth metal constituent against failure under tension by strengthening the micro crack structure of the glass, comprising:
   (a) applying to the surface of the glass an alkaline earth metal salt of a straight chain, saturated, mono-carboxylic fatty acid with terminal carboxyl group in a diluent carrier miscible and inert with respect to said salt, at a temperature between the melting point of the salt and 300° C., wherein the alkaline earth metal of the salt is the same as the known alkaline earth metal constituent of the glass; and
   (b) cooling the glass slowly to minimize thermal stress.

10. The method of claim 9, wherein said alkaline earth metal comprises calcium.

11. The method of claim 9, wherein said diluent carrier comprises a wax.

* * * * *